(12) United States Patent
Netzer

(10) Patent No.: US 6,628,741 B2
(45) Date of Patent: Sep. 30, 2003

(54) NON-VOLATILE PASSIVE REVOLUTION COUNTER WITH REED MAGNETIC SENSOR

(75) Inventor: Yishay Netzer, Yuvalim (IL)

(73) Assignee: Netzer Precision Motion Sensors Ltd., Misgav (IL)

(*) Notice: Subject to any disclaimer, the term of this patent is extended or adjusted under 35 U.S.C. 154(b) by 0 days.

(21) Appl. No.: 09/988,460

(22) Filed: Nov. 20, 2001

(65) Prior Publication Data

US 2003/0094945 A1 May 22, 2003

(51) Int. Cl.[7] .............. G01F 1/56; G01F 15/06; G01P 3/484; G01P 3/487; H01H 9/16
(52) U.S. Cl. .......... 377/21; 324/173; 324/174; 324/180; 73/861.78; 335/206; 335/207; 340/870.02
(58) Field of Search ............... 324/160, 163, 324/166, 168–174, 180, 207.13, 207.15, 259, 391, 392; 200/81.9 M; 73/861.08, 861.11, 861.77, 861.78; 335/205–207; 361/236, 239, 240; 377/15, 16, 21, 24, 24.1, 24.2; 340/870.02, 870.03

(56) References Cited

U.S. PATENT DOCUMENTS

| | | | | | |
|---|---|---|---|---|---|
| 3,321,702 A | * | 5/1967 | Tuccinardi | .................. | 324/259 |
| 3,826,985 A | * | 7/1974 | Wiley | .......................... | 324/173 |
| 4,025,819 A | * | 5/1977 | Lafever et al. | ............. | 361/236 |
| 4,506,339 A | * | 3/1985 | Kuhnlein | ................ | 324/163 X |
| 4,536,708 A | * | 8/1985 | Schneider | .................... | 324/174 |
| 4,970,463 A | * | 11/1990 | Wolf et al. | ............. | 324/174 X |
| 5,659,300 A | * | 8/1997 | Dresselhuys et al. | .. | 340/870.02 |
| 6,084,400 A | * | 7/2000 | Steinich et al. | ........ | 324/207.13 |
| 6,326,532 B1 | * | 12/2001 | Antaki | ........................ | 84/377 |
| 6,333,626 B1 | * | 12/2001 | Edwards | ............ | 324/207.13 X |

* cited by examiner

Primary Examiner—Gerard R. Strecker
(74) Attorney, Agent, or Firm—Mark M. Friedman

(57) ABSTRACT

A shaft revolution counter including one or more reed magnetic sensors interacting with one or more magnets attached to the shaft. The interaction generates voltage spikes in the reed magnetic sensors that are used as input signal to an electronic non-volatile counter, as well as its sole power source.

6 Claims, 4 Drawing Sheets

NON-VOLATILE PASSIVE REVOLUTION COUNTER WITH REED MAGNETIC SENSOR

FIELD OF THE INVENTION

This invention relates to shaft revolution counters in general, and in particular to electronic shaft revolution, and other event, counters that do not need an external power source, and do not employ moving mechanical parts.

BACKGROUND OF THE INVENTION

Revolution counters, in general, can be divided into two categories:
1. Bi-directional e.g. for multi-turn shaft angle encoders.
2. Uni-directional e.g. for recording the consumed quantity in a water meter.

Multi-turn shaft angle encoders are used where events (shaft revolutions) must be registered even when no power is available. For example, when a lead screw in an idle CNC machine is manually rotated, but the position of the driven load must be known when power is restored.

Prior art multi turn encoders usually employ a step-down gear mechanism followed by a single-turn encoder together making a non-volatile mechanical memory. It has been a long-standing desire to provide electronic non-volatile shaft revolution counters without a mechanical gear or a backup battery powering an electronic counter. Consequently, attempts have been made to tap on the motion of the rotating shaft in order to generate the electrical energy needed for the write process in an EEPROM.

German patents: DE 43 42 069 A1, DE 43 42 069 C2 (U.S. Pat. No. 5,565,769) and DE 44 13 281 C2 (U.S. Pat. No. 5,714,882) describe a bi-directional shaft revolution counter mechanism for a multi turn encoder that records shaft revolutions with no external power source and which responds even to very slow shaft rotations. It is based on a first permanent magnet pivoted between a stationary iron cored coil and the monitored shaft, and a second magnet that is attached to the monitored shaft. When the monitored shaft is rotating the first magnet is attracted to the second magnet and then snaps back. The abrupt motion induces a voltage pulse in the stationary coil, which is sufficient to operate a non-volatile counter comprising an EEPROM and a micro controller. This Electro-mechanical approach has several drawbacks:

Mechanical complexity combined with sensitivity to vibrations.
Appreciable torque disturbances to the monitored shaft in torque sensitive applications, such as water meters, due to interaction forces between the two magnets.

An alternative approach for counting shaft revolutions is based on tapping energy from the rotating shaft by means of a Wiegand sensor in combination with a magnet attached to the rotating shaft. However the energy content of such spikes is orders of magnitude lower than needed to energize EEPROMS and is marginally sufficient for energizing the newer Ferro electric memories, which are known to consume very low power—see U.S. Pat. No. 6,084,400. However, the energy content in the generated pulses is unstable which may lead to miscounts. The present invention employs a conventional reed relay in a novel manner to serve as a reed magnetic field sensor.

It is an object of the present invention to provide unidirectional and bi-directional electronic non-volatile shaft revolution, and other event, counters energized by reed magnetic sensors.

It is another object of the present invention to provide unidirectional and bi-directional shaft revolution counters with minimal torque disturbance to the rotating shaft. Further objects and advantages of the invention will become apparent as the description proceeds.

SUMMARY OF THE INVENTION

Reed relays comprise a coil and reed contact elements that close and open in response to magnetic field generated by current passage in the coil. These relays are known for many years and are conventionally used for making and breaking electrical contacts. The present invention is based on a novel use of the reed relay, referred to as a reed magnetic sensor—wherein it serves for detecting magnetic fields with no regard to its electrical contacts. The novel application is based on an interaction between a reed magnetic sensor and ambient magnetic field, typically due to rotating magnet. This induces voltage spikes in the coil that both energize a non-volatile electronic counter and are counted by it.

According to a preferred embodiment of the invention a bidirectional shaft revolution counter includes an assembly comprising a magnet mounted on the rotating shaft, and three stationary reed magnetic sensors facing the magnet and generating voltage spikes in response to said shaft rotation. The voltage spikes are applied to an electronic state machine and counter that typically includes Ferro-electric non-volatile logic elements. A further preferred embodiment of the invention suitable for water meters is a uni-directional revolution counter with a single stationary reed magnetic sensor facing said magnet.

A still further object of the invention is to provide a rotation sensing based on detecting the teeth of a ferromagnetic tooth gear.

BRIEF DESCRIPTION OF THE DRAWINGS

FIG. 5-*b* Illustrates an embodiment of a gear coupled revolution sensor in a water meter.

FIG. 5-*c* Illustrates a conceptual remotely read passive water meter.

FIG. 6-*b* illustrates an embodiment of a bi-directional ferromagnetic tooth train counter according to the present invention.

DETAILED DESCRIPTION OF THE PREFERRED EMBODIMENTS

Figure 1:
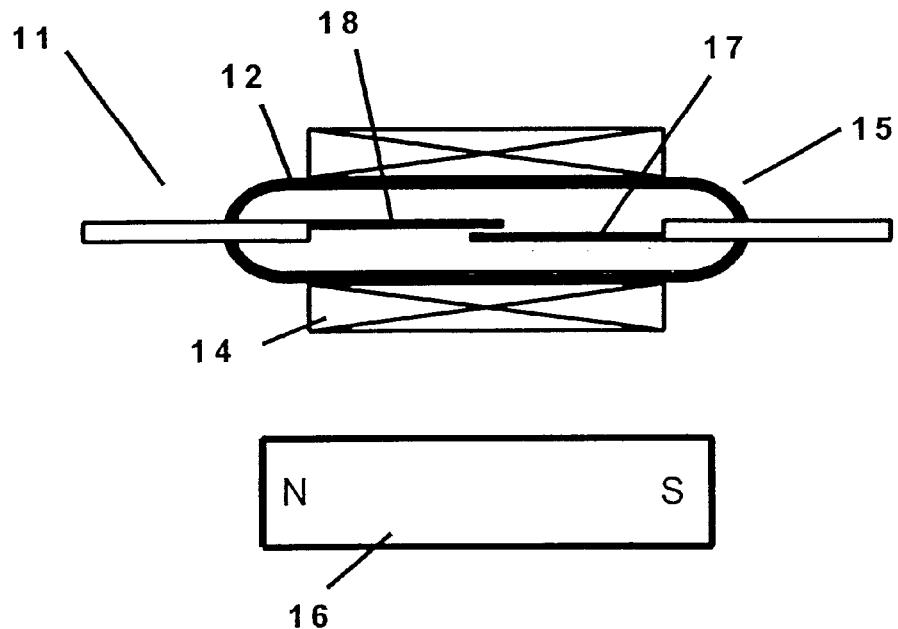
FIG. 1 illustrates the reed magnetic sensor.
Figure 2:
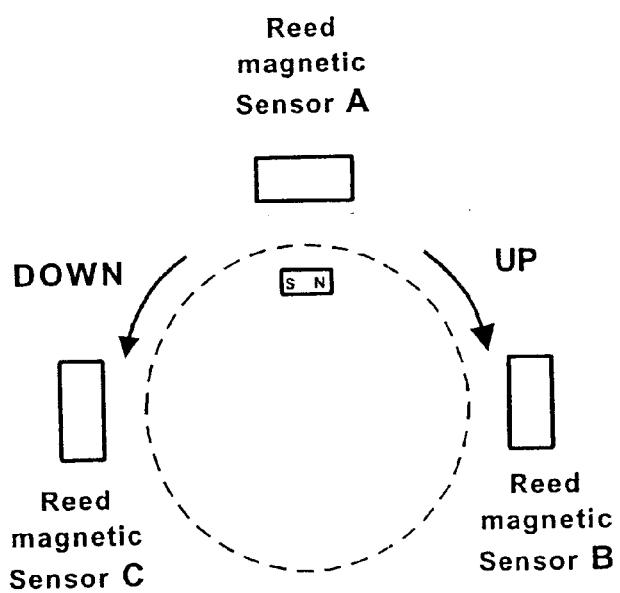
FIG. 2. Illustrates a preferred embodiment of a bi-directional shaft revolution counter according to the present invention.

FIG. 1 illustrates the principle of the reed magnetic sensor, which is based on a novel utilization of a conventional reed relay. The reed magnetic sensor 11 comprises a reed switch 15 which can be a commercial or a similarly constructed one, a pickup coil 14, and a magnet 16. The reed relay includes a glass envelope 12 and two magnetically soft reed elements 17 and 18. Electrical contact between the reeds is not essential for the present invention. When magnet 16 approaches the reed switch 15 reed elements 17 and 18 are magnetized and attract each other with a force, which is inversely dependent on the gap separating them, and is opposed by their stiffness. At some level of magnetization the reeds snap and touch each other. Since they are made of a magnetically soft metal they are a part of a magnetic circuit the impedance of which is abruptly changing when the gap between them is closed, this leads to an abrupt change in the flux through coil 14 inducing a voltage pulse which serves as the output signal of the reed magnetic sensor. It is important to note that the snap motion is independent of the speed of the magnet and the output pulse amplitude and duration are essentially fixed. The shaft revolution counter in FIG. 2 includes a magnet mounted on the rotating shaft, and three stationary reed magnetic sensors A, B, and C. As the shaft rotates the magnetic field in each reed magnetic sensor varies to generate a voltage pulse. It can be shown that at least three reed magnetic sensors are necessary in order to count bi-directional shaft revolutions without being prone to errors caused by non-uniform rotation of the shaft.

Figure 3:
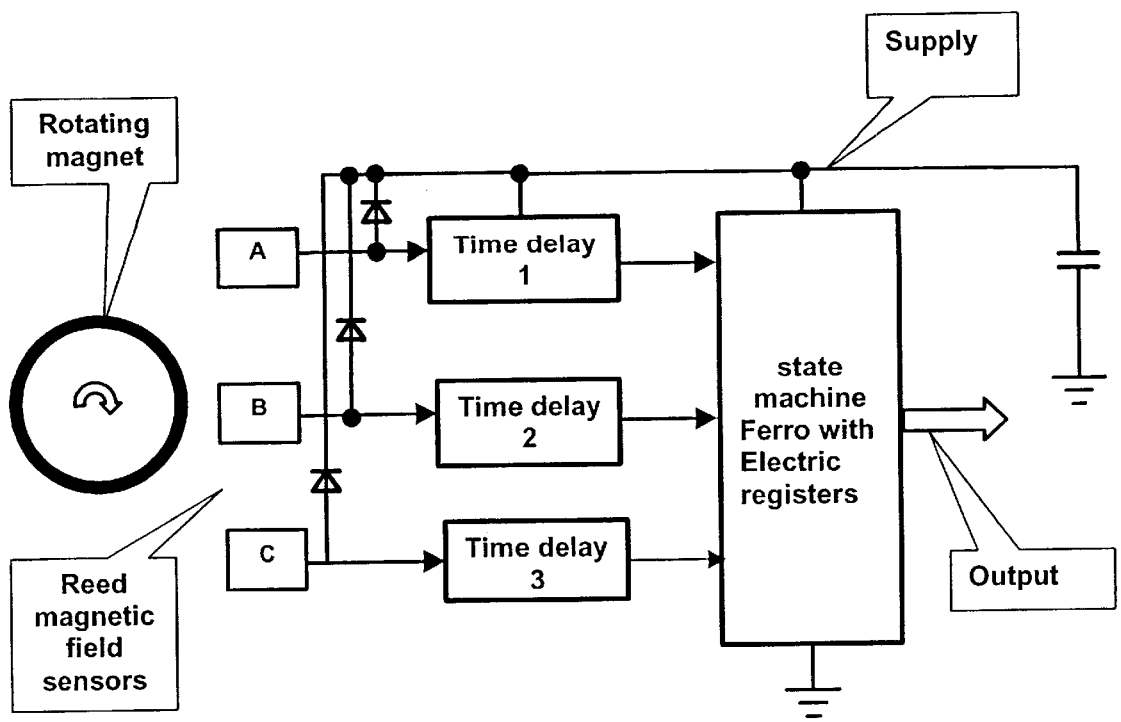
FIG. 3. Illustrates a block diagram of a preferred embodiment of a bi-directional shaft revolution counter according to the present invention.

A block diagram of a preferred embodiment of the invention is illustrated in FIG. 3 wherein the output spikes of the three reed sensors A, B, and C, are applied to a state machine that includes Ferro-electric memory elements—e.g. the FM574, made by Ramtron International Corp. of Colorado Springs, Colo. The voltage spikes are used for both energizing the state-machine and counter circuitry and as inputs to be counted by it. In the preferred embodiment of the invention, they are directly applied to the power supply line via that charge a capacitor as shown. The spikes are delayed, by means of delay elements, prior to being applied to the state machine, in order to satisfy timing requirements. It is possible, but not mandatory, to use the electrical contact between the reeds for timing purposes.

Figure 4:
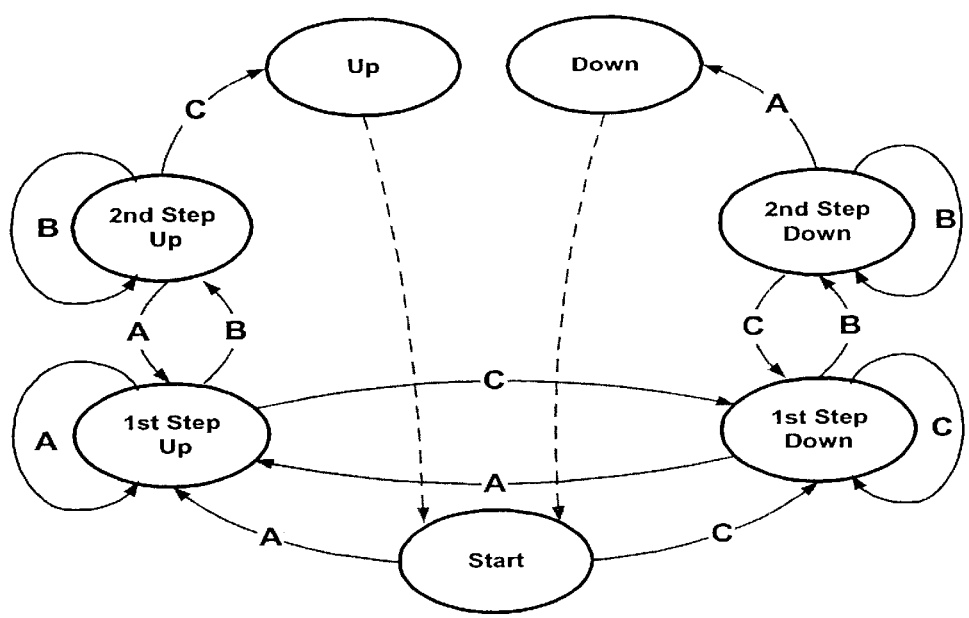
FIG. 4. Illustrates a state graph of the embodiment in FIGS. 2 and 3.

FIG. 4 illustrates a flow diagram of the states machine that outputs "up" and "down" commands to a bidirectional counter.

It is well known that states transition in a CMOS counter are accompanied by current supply spikes that may excessively discharge the capacitor. The problem is compounded in a multi stage counter if multiple simultaneous transitions are not prevented. It was found that this problem can be avoided by employing a counter with a Gray coded output— well known to those skilled in the art as having only single transition at any time—thereby enabling a reed magnetic sensor to power multi stage counters. It is obvious that more magnets can be mounted on the shaft to result in more than one count per mechanical revolution.

Figure 5A:
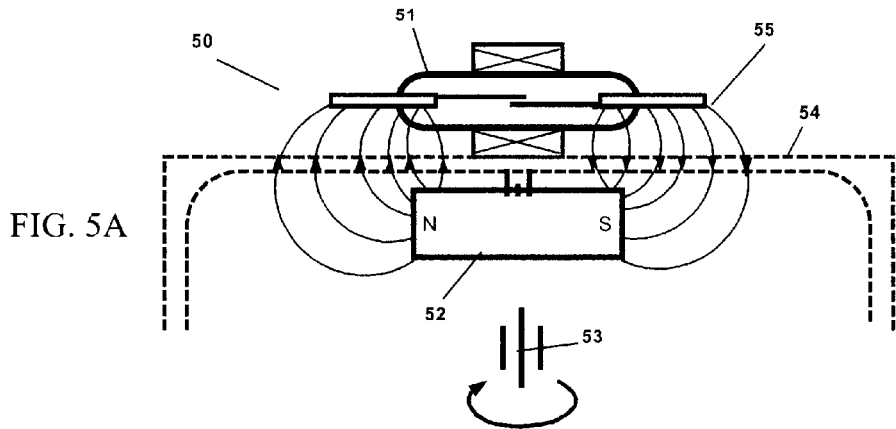
FIG. 5-*a*. Illustrates a magnet on a rotating shaft inside a water meter.
Figure 5B:
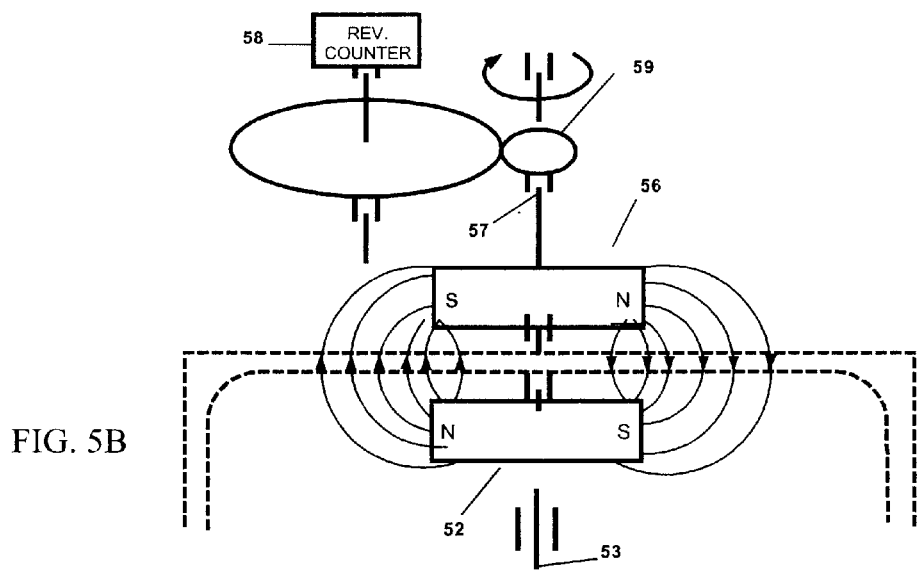
Figure 5C:
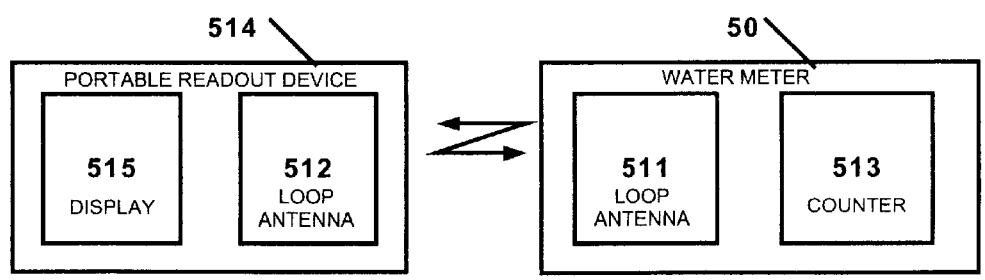

There are applications where bi-directional counting is not necessary, such as in impeller type water meters. In such applications a single magnet and a single reed magnetic sensor are sufficient. FIG. 5-*a* illustrates schematically a preferred embodiment of a water meter 50 with a uni-directional shaft revolution counter according to the present invention. The water meter includes a chamber 54 with inlet port, an outlet port, and a rotatable impeller (—all not shown) the impeller is supported by a shaft 53 that also supports magnet 52. This configuration minimizes torque disturbance on the impeller due to attraction between the magnet and reed sensor. External to the water chamber 54 is a reed magnetic sensor 51 interacting with magnet 52 through magnetic field lines 55 to generate voltage pulses which are applied to a non-volatile pulse counter according to the present invention (—not shown). Although the impeding torque exerted on the rotating magnet 52 by the reed magnetic sensor 51 is small, it may still be significant in high sensitivity water meters.

FIG. 5-*b* illustrates schematically a portion of a modified water meter with increased sensitivity which is obtained by coupling the impeller rotation to the outside of the chamber through a second magnet 56 on a second shaft 57 which is coupled to a revolution counter 58 of the present invention through a step down gear mechanism 59 (shown schematically).

FIG. 5-*c* schematically illustrates a remotely interrogated passive water meter that can provide the accumulated amount of water without physical contact, according to a preferred embodiment of the invention. Electronic section 50 of the water meter includes a transmitter/receiver loop antena 511 that is inductively coupled and receives energy from a portable readout device 514. The portable readout device includes a transmitter/receiver loop antena 512, that is also an energy transmitter, and a display 515. The alternating voltage induced in antena 511 is rectified to generate a supply voltage, which is sufficient to operate non-volatile electronic counter 513, and transmit this information back to portable readout device 514 where it is stored, or displayed with display device 515. Portable device 514 can optionally be used to manipulate the stored count in the water meter.

It is obvious that the communication channel between the water meter and portable device is securly coded to eliminate ilegitimate manipulation of the stored number in water meter 50 and that the enegy supplied to the water meter can be supplied otherwise, such as by a laser beam.

Figure 6A:
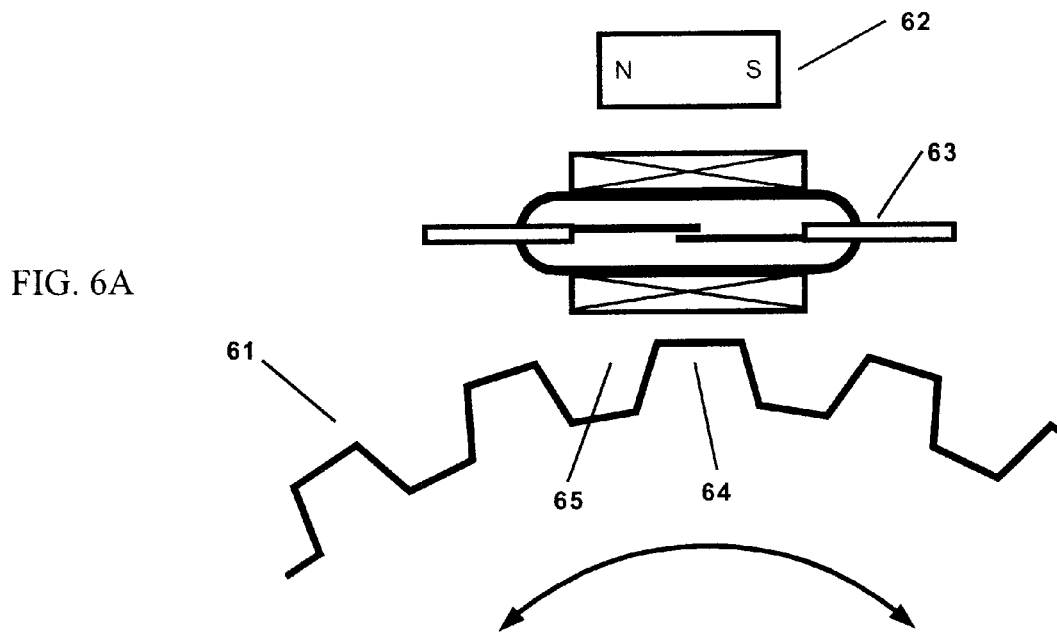
FIG. 6-*a* illustrates an embodiment of a unidirectional tooth gear revolution counter according to the present invention.
Figure 6B:
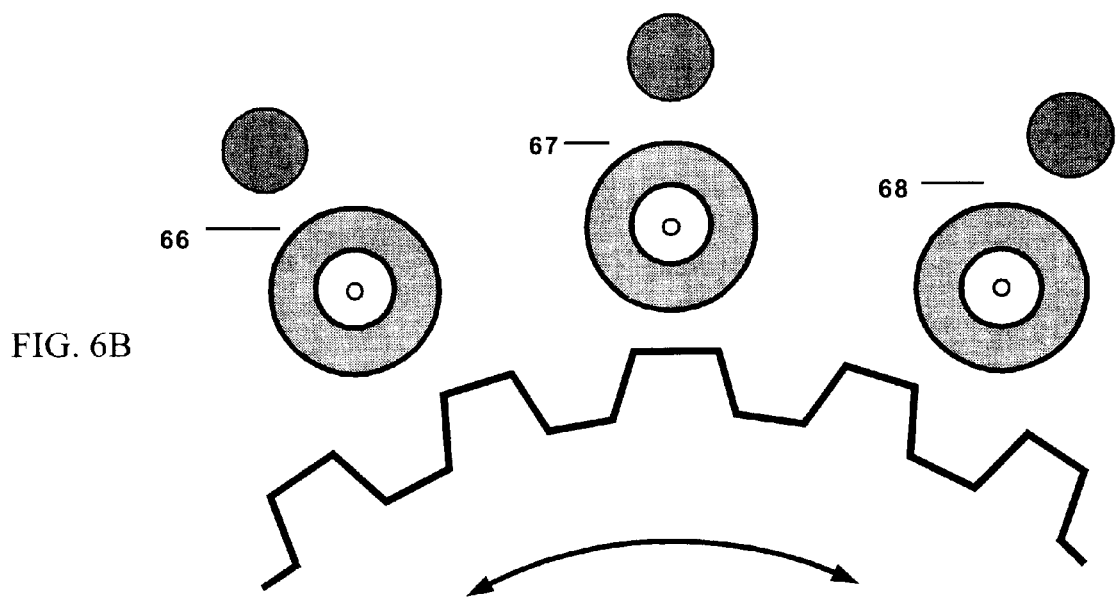

A further embodiment of the invention, illustrated in FIG. 6-*a*, is intended for uni directionally counting the teeth of a magnetically soft tooth gear 61 wherein a reed magnetic sensor 63 in combination with bias magnet 62 and tooth 64 constitute a magnetic circuit that varies as the wheel rotates. The system parameters are designed such that as the wheel rotates and tooth 64 is replaced with gap 65 the reed magnetic sensor is actuated and generates an output pulse. The reed magnetic sensor 63 and magnet 62 are preferably oriented parallel to the rotation axis and are oriented as shown only for clarity. A preferred, bi-directional, embodiment of the invention is illustrated in FIG. 6-*b* and includes three reed magnetic sensors 66, 67 and 68 disposed such that rotational increment of one pitch will results in three consecutive pulses in the three reed magnetic sensors. Each tooth increment is equivalent to a full rotation of the shaft in FIG. 2; therefore, employing the block diagram in FIG. 3 to implement the state machine of FIG. 4 will provide a bi-directional pulse counter that passively monitors the shaft rotation. The same scheme can be used for counting pulses generated by the linear motion of a tooth bar.

The invention can be similarly used for counting any kind of event that is, or can be translated into, a magnetic field change—sufficient to trigger the reed magnetic sensor. For example, by adding ferro magnetic flux concentrators—well known to those skilled in the art, the reed magnetic switch may be sensitive enough to be triggered by the earth magnetic field. If three such sensors are mounted, in accordance with the above teaching, on a platform that rotates around a verical axis, the rotation of the platform can be monitored in a non volatile manner and without a power supply.

It should be emphasized that the teaching of the present invention can be practiced differently from the preferred embodiments illustrated. For example, the magnetizable elements can be replaced with two ferromagnetic discs facing each other wherein at least one of them is and supported by spring element that enablesgap closure when the magnetic discs are magnetized.

What is claimed is:

1. A device for counting based upon cyclic variations in a magnetic field, the device comprising:
   (a) at least one reed magnetic sensor including:
      (i) a reed mechanism having at least two magnetizable members initially separated by a gap and responsive to a varying magnetic field to abruptly close said gap, thereby causing an abrupt change in magnetic flux through said magnetizable members, and
      (ii) a pickup coil associated with said reed mechanism, said abrupt change in magnetic flux through said magnetizable members inducing a voltage pulse in said pickup coil; and
   (b) a non-volatile electronic counter electrically associated with said pickup coil, said non-volatile electronic counter being responsive to, and actuated solely by, said pulses.

2. A device for counting the accumulated bi-directional number of revolutions of a shaft, said device including:
   at least one magnet attached to said shaft;
   at least three stationary reed magnetic sensors, each of said reed magnetic sensors including:
      (a) a reed mechanism having at least two magnetizable members initially separated by a gap and responsive to a varying magnetic field to abruptly close said gap, thereby causing an abrupt chanae in magnetic flux throuah said magnetizable members, and
      (b) a pickup coil associated with said reed mechanism, said abrupt change in magnetic flux through said magnetizable members inducing a voltage pulse in said pickup coil,
   said reed magnetic sensors in combination with said magnet generating voltage pulses with an energy in response to said shaft revolutions; and
   a non-volatile electronic counter electrically associated with said at least three reed magnetic sensors, said counter being responsive to, and actuated solely by, said pulses.

3. A device for counting the accumulated uni-directional number of revolutions of a shaft, said device comprising:
   at least one magnet mounted on said shaft, at least one reed magnetic sensor, and a non-volatile electronic counter, said at least one reed magnetic sensor including:
      (a) a reed mechanism having at least two magnetizable members initially separated by a gap and responsive to a varying magnetic field to abruptly close said gap, thereby causing an abrupt change in magnetic flux through said magnetizable members, and
      (b) a pickup coil associated with said reed mechanism, said abrupt change in magnetic flux through said magnetizable members inducing a voltage pulse in said pickup coil,
   said at least one reed magnetic sensor in combination with said at least one magnet generating voltage spikes in response to said shaft revolutions, said counter being responsive to, and actuated solely by, said pulses.

4. An impeller type water meter with a rotating shaft, wherein said shaft rotations are monitored by a shaft revolution counter as in claim 3.

5. A remotely readable water meter comprising the water meter of claim 4 operating in combination with a portable readout device, wherein said water meter includes an energy receiving means and an information transmitting means, and wherein said portable readout device includes:
   an energy transmitting means for energizing said water meter and an information receiving means for receiving information from said water meter.

6. A counter for counting ferromagnetic moving teeth, said counter comprising at least three reed magnetic sensors, each of said reed magnetic sensors including:
   (a) a reed mechanism having at least two magnetizable members initially separated by a gap and responsive to a varying magnetic field to abruntlv close said gap, thereby causing an abrupt change in magnetic flux through said magnetizable members,
   (b) a pickup coil associated with said reed mechanism, said abrupt change in magnetic flux through said magnetizable members inducing a voltage pulse in said pickup coil,
   (c) a bias magnet,
   said reed magnetic sensors responding to said teeth motion by generating signal pulses which are counted with a non-volatile electronic counter which is responsive to, and energized solely by, said pulses.

* * * * *